United States Patent Office 3,497,594
Patented Feb. 24, 1970

3,497,594
COMBINATIONS OF QUINOXALINE-DI-N-OXIDES AND TETRACYCLINE ANTIBIOTICS
James D. Johnston, Old Saybrook, Conn., assignor to Chas. Pfizer & Co., Inc., New York, N.Y., a corporation of Delaware
No Drawing. Continuation-in-part of applications Ser. No. 468,153, June 29, 1965, Ser. No. 470,934, July 9, 1965, and Ser. No. 587,420, Oct. 18, 1966. This application June 1, 1967, Ser. No. 642,723
Int. Cl. A61k 21/00
U.S. Cl. 424—227          8 Claims

ABSTRACT OF THE DISCLOSURE

Chemical reduction of water-soluble quinoxaline-di-N-oxides in aqueous solution by zinc metal is inhibited by contacting the zinc metal with an aqueous solution of a water soluble tetracycline antibiotic to form a zinc complex of tetracycline antibiotic coating thereon. The quinoxaline-di-N-oxides, which are antibacterial agents, may be administered to animals and poultry via drinking water, with water-soluble tetracycline antibiotic as co-solute to inhibit reduction by zinc metal surface of commonly used galvanized iron drinking troughs. Compositions comprising 5-hydroxytetracycline and certain quinoxaline-di-N-oxides such as 2-methyl-3-hydroxymethylquinoxaline-di-N-oxide, and 2-formylquinoxaline-di-N-oxide and Schiff bases thereof, exhibit a synergistic effect in the control of chronic respiratory disease of poultry and in promoting the growth of animals, and also inhibit in vitro drug resistance development of *E. coli*.

Cross references to related applications

This application is a continuation-in-part of copending applications Ser. Nos. 468,153, filed June 29, 1965 which is now U.S. Patent No. 3,344,022, 470,934, filed July 9, 1965 which is now U.S. Patent No. 3,371,090 and 587,420, filed Oct. 18, 1966. These applications in turn are, respectively, continuations-in-part of Ser. Nos. 393,-311, filed Aug. 31, 1964, 397,504, filed Sept. 16, 1964, and 502,602, filed Oct. 22, 1965, all of which are abandoned.

This application discloses subject matter relating to the invention of copending application of Conover and Johnston, entitled "Tetracycline-induced Inhibition of Photochemical Decomposition of Quinoxaline-N,N'-dioxides."

Background of the invention

This invention relates to a method of inhibiting the chemical reduction of water-soluble quinoxaline-di-N-oxides in aqueous solution by zinc metal, and in particular to the use of tetracycline antibiotics to inhibit said chemical reduction. This invention also relates to novel compositions comprising a tetracycline antibiotic and quinoxaline-di-N-oxide, and more particularly to compositions comprising 5-hydroxytetracycline and a quinoxaline-di-N-oxide which are especially effective for the control of chronic respiratory disease in poultry and as growth promotants for domestic animals and to animal feeds containing said compositions.

It is known that many quinoxaline-di-oxides are useful as antibacterial agents, but heretofore their use as chemotherapeutic agents has been impaired to a certain extent by the ease with which these compounds are chemically reduced. For example, attempts to administer quinoxaline-di-N-oxides to poultry via drinking water are often impaired since the zinc metal surface of the commonly used galvanized iron troughs and trays reduces the compounds to products which do not share the antibacterial activity of the quinoxaline-di-N-oxides.

The term "chronic respiratory disease" as used throughout this application includes "complicated chronic respiratory disease," "infections sinusitis" and related diseases. The field condition commonly known as "air sac" disease, air-sacculitis or complicated chronic respiratory disease is generally considered to involve Mycoplasma and secondary infections, especially those caused by coliforms such as *Escherichia coli*, Proteus and Micrococcus species. Mycoplasma, especially *M. gallinarum*, *M, gallisepticum, M. iners, M. synovaei* and type N–PPLO (pleuropneumonia-like organisms) are believed to be the primary agents responsible for chronic respiratory and related diseases of poultry and of infectious sinusitis of turkeys.

The economic significance of such avian diseases has led to extensive research on practical measures of immunization and effective therapeutic products. Various antibiotics, including 5-hydroxytetracycline, have been used at levels of 100 to 500 gms./ton of feed or in the animals' drinking water at concentration of 0.5 to 1.0 gm./gal. with some benefit, probably by their control of susceptible secondary bacterial infections. Intra-muscular injection of streptomycin and chlortetracycline is also reported to be beneficial. Price et al., Poultry Science 36, 219–225 (1957) found 55-hydroxytetracycline at 100 and 500 gms./ton of feed markedly reduced coliform invasion in chronic respiratory disease infected chickens and had some influence on the course of the disease. The increased beneficial effect observed at the higher level was attributed to direct action of the drug against the etiological agent. Recent studies by Sojka et al. (Res. Vet. Sci. 2, 340, 1961) have shown a surprising increase in the incidence of *E. coli* strains resistant to antibiotics. Because of this, the countermeasures developed for the control of chronic respiratory disease have not been totally satisfactory.

The development of quinoxaline-di-N-oxides as agents especially effective for the control of chronic respiratory disease is described by Johnston in U.S. Ser. Nos. 468,153, filed June 29, 1965, 470,934, filed July 9, 1965, and 587,420, filed Oct. 18, 1966. These compounds control not only the secondary infections associated with chronic respiratory disease but are surprisingly effective against Mycoplasma and promote growth and feed efficiency in both diseased and healthy poultry and in domestic animals in general. Stephens U.S. Patent 2,974,167, issued Mar. 7, 1961, discloses that the 1:1 adducts of the tetracycline antibiotics (tetracycline, 5-oxytetracycline and 7-chlorotetracycline) with 2-methyl-3-formylquinoxaline-di-N-oxide exhibit biological activity against a variety of pathogenic microorganisms. The instant invention differs from the Stephens invention in that the latter relates to distinct chemical compounds which are necessarily formed in a substantially non-aqueous inert organic solvent. These 1:1 adducts are not present in compositions of the instant invention and are not formed in carrying out the methods of the instant invention.

Summary of the invention

It has been unexpectedly found that reduction of quinoxaline-di-N-oxides in aqueous solution by zinc metal can be inhibited by coating the surface of the zinc metal with a zinc complex of a tetracycline antibiotic. By "tetracycline antibiotic" is meant throughout that class of compounds possessing a common type of structure, that is, each of these compounds has a hydronaphthacene ring system, highly substituted with oxygen-containing groups and other substituents; this class of compounds is meant to include compounds naturally produced by fermentation processes, compounds produced by total synthesis and derivatives of those compounds produced by further chemical transformation. Also included in this class are the various salts of aforesaid tetracycline antibiotics. The coating can be easily applied to the surface by contacting the zinc metal surface with an aqueous solution of a water-soluble tetracycline antibiotic; the use of a water-soluble salt of tetracycline antibiotic is most convenient. Effective inhibition is achieved either by pretreating the zinc metal surface with the tetracycline antibiotic solution or by simply adding a quantity of the tetracycline antibiotic to the aqueous solution of quinoxaline-di-N-oxide.

This method of inhibiting reduction of quinoxaline-di-N-oxides in aqueous solution by zinc metal is both extremely effective and convenient. Since tetracycline antibiotics are often administered to animals and poultry via drinking water, it is now highly desirable to combine the administration of these compounds with that of the quinoxaline-di-N-oxides. The use of a single solution to administer both antibacterial agents not only simplifies the treatment of the animals and poultry, but also unexpectedly serves to stabilize the quinoxaline-di-N-oxides against chemical reduction. Although it might be expected that certain compounds other than the tetracycline antibiotics will inhibit the reduction of quinoxaline-di-N-oxides, it is an important and unexpected advantage of the instant invention that this condition can be achieved by compounds having substantial chemotherapeutic activity themselves.

The method of the instant invention protects the N-oxide function of all water-soluble quinoxaline-di-N-oxides in aqueous solution against reduction by zinc metal. However, a preferred embodiment of this invention is the protection of those quinoxaline-di-N-oxides especially noted for their antibacterial or growth promoting properties, viz, water-soluble quinoxaline-di-N-oxides of the general formulae

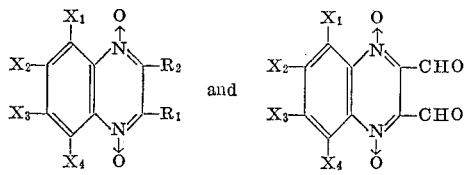

wherein $R_1$ is selected from the group consisting of hydrogen, alkyl of up to 10 carbon atoms, α-hydroxy lower alkyl, α-lower alkanoyloxy lower alkyl and α-lower alkoxy lower alkyl; $R_2$ is selected from the group consisting of akyl of up to 10 carbon atoms, lower alkanoyl, α-hydroxy lower alkyl, α-lower alkanyloxy lower alkyl and α-lower alkoxy lower alkyl; $R_1$ and $R_2$, taken together, are selected from the group consisting of trimethylene, tetramethylene and 1,4-dihydroxytetramethylene; and $X_1$, $X_2$, $X_3$ and $X_4$ are each selected from the group consisting of hydrogen and lower alkyl.

A particularly preferred embodiment of the instant invention is compositions or mixtures comprising 5-hydroxytetracycline and a quinoxaline-di-N-oxide selected from the group consisting of those having the formulae

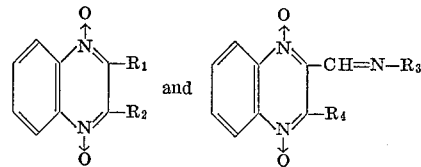

wherein:

$R_1$ is selected from the group consisting of methyl, hydroxymethyl, acetoxymethyl and formyl;
$R_2$ is selected from the group consisting of hydrogen, methyl, hydroxymethyl and acetoxymethyl:

With the proviso that $R_2$ is hydrogen when $R_1$ is formyl;

$R_1$ and $R_2$ when taken together are

—CH(OH)—CH$_2$—CH(OH)—

$R_3$ is selected from the group consisting of ureido (—NHCONH$_2$), thionoureido (—NHCSNH$_2$); carbo(lower alkoxy)amino (—NHCOOR$_5$) wherein the lower alkoxy group OR$_5$ contains up to four carbon atoms; 3-(2-oxazolidonyl)

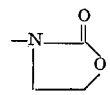

hydroxy; methylamino; and acetylamino; and
$R_4$ is selected from the group consisting of hydrogen and methyl, since it has now been found that these compositions exhibit a synergistic effect in the control (therapy and propylaxis) of chronic respiratory disease of poultry and in promoting the growth of domestic animals such as poultry (chickens, turkeys, ducks), lambs, cattle, swine, goats, horses, dogs and cats.

The use of various antibiotics for the treatment of chronic respiratory disease and for accelerating the growth of domestic animals has long been known. However, the combination of 5-hydroxytetracycline and a quinoxaline-di-N-oxide such as those enumerated above results in a synergistic effect in the treatment of chronic respiratory disease and an accelerated rate of growth wholly unexpected from that heretofore observed.

Detailed description of the invention

An especially preferred embodiment in the method of inhibition of chemical reduction is the class of water-soluble quinoxaline-di-N-oxides which possess useful chemotherapeutic properties, such as 2-methyl-3-hydroxymethylquinoxaline-di-N-oxide, 2,3-dimethylquinoxaline-di-N-oxide, 2-methylquinoxaline-di-N-oxide, 1,2,3,4-tetrahydrophenazine-di-N-oxide, 1,4-dihydroxy-1,2,3,4-tetrahydrophenazine-di-N-oxide and 2,3-trimethylenequinoxaline-di-N-oxide. Most preferred is 2-methyl-3-hydroxymethylquinoxaline-di-N-oxide. These compounds are highly effective in maintaining weight gain and feed consumption of poultry in the presence of chronic respiratory disease and in controlling chronic respiratory disease, and in accelerating growth and improving feed efficiency of animals.

Inasmuch as the inhibition of reduction of the preferred class of quinoxaline-di-N-oxides is usually of concern when administering the compounds to animals and poultry, it is desirable to use a tetracycline antibiotic which would be similarly administered for its own chemotherapeutic value. For example, tetracycline, 5-hydroxytetracycline, 7-chlorotetracycline, 6-deoxy-6-demethyl-6-methylene-5-hydroxytetracycline (hereinafter referred to as "methacycline") and α-6-deoxy-5-hydroxytetracycline (hereinafter referred to as "doxycycline") are illustrative of tetracycline antibiotics which have this advantage. 5-hydroxytetracycline is a preferred tetracycline antibiotic. Of course, it is understood that tetracycline antibiotics with other substituents would be equivalent for the purpose of the instant invention, even if they would not normally be administered for their own chemotherapeutic properties.

A preferred method for coating the zinc metal surface is to contact the surface with an aqueous solution of a water-soluble tetracycline antibiotic. For example, exposure of the zinc metal surface to aqueous 5-hydroxytetracycline hydrochloride results in the formation of a yellow stain on the metal surface. This stain, the zinc complex of 5-hydroxytetracycline, appears to be much like a monolayer, which can be removed from the zinc metal surface by means such as scraping only with great difficulty. Inasmuch as the complex coating forms rather quickly, it is not necessary to pretreat the surface to obtain protection of the quinoxaline-di-N-oxides; the 5-hydroxytetracycline hydrochloride may be present in the quinoxaline-di-N-oxide solution as a co-solute and reduction of the latter compound is still effectively inhibited.

If the coating is to be formed by contacting the surface with aqueous solution of the tetracycline antibiotic, a water-soluble salt of the tetracycline antibiotic is preferably used since the water-soluble salts are soluble in water to a much greater degree than is the amphoteric form of the antibiotics. Inasmuch as the degree of protection of the quinoxaline-di-N-oxides is a function of the amount of tetracycline in solution, it is usually much more convenient to use the water-soluble salts; said salts will often permit the use of various tetracycline antibiotics the amphoteric forms of which are insufficiently soluble in water to result in an effective degree of protection. Of course, to the extent that the amphoteric antibiotics may be sufficiently soluble in water to permit effective and convenient coating of the metal surface, it is understood that the use of the amphoteric form is completely equivalent to the use of the water-soluble salts.

If the tetracycline antibiotic is to be a co-solute and be administered along with the quinoxaline-di-N-oxide, there is no problem of the tetracycline antibiotic being present in an insufficient amount to be effective in inhibiting reduction of quinoxaline-di-N-oxide; an amount sufficient for therapeutic purposes will be sufficient to protect the quinoxaline-di-N-oxide. It is preferable that between about a 0.10 and 10.0 molar equivalent amount of tetracycline antibiotic be used with respect to the amount of quinoxaline-di-N-oxide used. However, it is understood that the use of tetracycline antibiotics in any amount will be effective to a certain extent; insofar as any zinc complex forms a coating on the surface of the metal, a corresponding degree of inhibition will result. Between about 0.4 and 8.0 molar equivalent amount of tetracycline antibiotic is more preferred, with about 1.2 molar equivalent amount being most advantageous. If the tetracycline antibiotic is to be a co-solute and be administered along with the quinoxaline-di-N-oxide, the water-soluble salt must be pharmaceutically acceptable. By "pharmaceutically acceptable" is meant those salt-forming acids and metals which do not substantially increase the toxicity of the amphoteric antimicrobial agent.

The pharmaceutically acceptable acid addition salts include salts of mineral acids such as hydrochloric hydroiodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluenesulfonic acids, and the like. The pharmaceutically acceptable metals include sodium, potassium and alkaline earth metals of atomic number up to and including 20, i.e. magnesium and calcium, and additionally, aluminum, zinc, iron and manganese, among others. Of course, the metal salts include complex salts, i.e. metal chelates, which are well recognized in the tetracycline art.

The pharmaceutically unacceptable salts of the tetracycline antibiotics may be used if the zinc metal surface is pretreated to form a coating of the zinc complex, with the surface then washed clean of pharmaceutically unacceptable species prior to the use of the quinoxaline-di-N-oxide solution. The pharmaceutically unacceptable acid addition salts include those formed with hydrofluoric and perchloric acids. The pharmaceutically unacceptable metal salts embrace most commonly salts of lithium and of alkaline earth metals of atomic number greater than 20, i.e. barium and strontium.

Inasmuch as the instant invention relates to a method of stabilizing quinoxaline-di-N-oxides against chemical reduction, it is noted that the invention of aforesaid co-pending application of Conover and Johnston does not make the instant invention obvious to one skilled in the art, and similarly, is not itself made obvious in light of the instant invention. The phenomenon of chemical reduction by zinc metal is not related to, or comparable to, photochemical decomposition; a method of preventing either of the two phenomena would not suggest to one skilled in the art that the other could be prevented in a similar fashion.

When the combinations of 5-hydroxytetracycline and quinoxaline-di-N-oxides are used in animal feeds, the 5-hydroxytetracycline component is used to the extent of from about 10 to about 2000 g. per ton of feed and the quinoxaline-di-N-oxides to the extent of from about 10 to about 500 g. per ton of feed.

The effectiveness of the herein described combinations against coliform infections is considered to be one of synergism of the effect of the quinoxaline-di-N-oxide by the 5-hydroxytetracycline since the coliform test infections are substantially resistant to 5-hydroxytetracycline.

For a given level of 5-hydroxytetracycline, the addition of one of the herein described quinoxaline-di-N-oxides increases the activity of the 5-hydroxytetracycline against resistant *E. coli* to such a significant extent as to be considered synergistic. Insofar as the combinations of 5-hydroxytetracycline and quinoxaline-di-N-oxides appear to inhibit the in vitro drug resistance development of *E. coli*, it is expected that these combinations might produce a similar retardation of in vivo resistance development. This phenomenon would offer a possible way of reducing quinoxaline-di-N-oxide toxicity by permitting a reduction in dosage. Likewise, the addition of 5-hydroxytetracycline to a given level of one of said quinoxaline-di-N-oxides produces a synergistic effect in the activity of the quinoxaline-di-N-oxide against PPLO infections.

In the novel compositions or mixtures of this invention the ratio of antibiotic to quinoxaline-di-N-oxide is from about 1:50 to about 200:1. The preferred ratio of antibiotic to quinoxaline-di-N-oxide is from about 1:1 to about 20:1. The quantity of novel composition administered depends, of course, upon the route of administration and the purpose for which the composition is used, e.g. control of chronic respiratory disease, growth promotion, and the animal to be treated.

For the purposes described herein the novel and valuable compositions of this invention can be administered orally or parenterally. Subcutaneous and intramuscular injections are the preferred methods of parenteral injection for several reasons; simplicity, convenience and the compounds appear less toxic. According to one modification of the present invention the compositions described herein when used therapeutically are administered orally or parenterally, e.g. by subcutaneous or intramuscular injection, so as to provide each component of the composition to poultry in a dosage of from about 1 mg./kg. to about 100 mg./kg. of body weight for the control of chronic respiratory disease. When administered orally it is preferred to use a dosage which provides each component at from about 1 mg./kg. to about 60 mg./kg. of body weight. For parenteral administration dosages which provide each component at from about 10 mg./kg. to about 100 mg./kg. of body weight are preferred.

For prophylactic use these novel compositions are administered so as to provide from about 10 to about 100 mg./kg. of body weight of a quinoxaline-di-N-oxide and from about 10 to about 500 mg./kg. of antibiotic daily.

These compositions can be used either in the form of solutions or suspensions, aqueous or non-aqueous. When administered parenterally, a single dose is generally sufficient, but in the event multiple doses are employed, the dosage is repeated at a suitable interval, e.g. weekly, monthly. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as hyaluronidase (spreading factor), local anesthetics and inorganic salts to afford desirable pharmacological properties.

In general no tissue irritation results from the subcutaneous injection of these compositions. However, as a precaution against possible irritation and to facilitate absorption, parenteral administration of these compositions in combination with hyaluronidase can be employed. An increase in the rate of absorption of the drugs is observed and the occasional discomfort on injection is greatly reduced, if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the poultry following injection of the drug preparation.

Dry mixtures containing the active ingredients together with salt (sodium chloride) and/or buffering agents or local anesthetics are prepared for extemporaneous use. A total concentration of active ingredients in such mixtures of at least about 50% is useful.

According to a further modification of the present invention, these valuable compositions are administered to poultry by the oral route by incorporating said compositions in the daily rations so as to provide each component at a dosage of from about 1 to about 60 mg./kg. of body weight. This can be achieved by a number of methods including mixing with a nutritionally-balanced feed, the preparation of concentrates, dosage unit formulations such as capsules, tablets, liquid mixtures and solutions, or they can be administered in admixture with minerals such as sodium chloride which are frequently fed to poultry as a supplement. Dilute solutions or suspensions, e.g. a 0.1% solution, can be supplied for drinking purposes. Indeed, levels of about 300–500 mg./gal. of quinoxaline-di-N-oxide, e.g. 2 - methyl-3-hydroxymethylquinoxaline-di-N-oxide, plus 1000 mg./gal. of a salt of tetracycline antibiotic, e.g. 5-hydroxytetracycline, have been found very effective in the treatment of chronic respiratory disease. Of course, the actual concentration to be used will be determined by the person skilled in the art who prescribes the use of these combinations.

The unique feed compositions of this invention are found to be particularly valuable for use with poultry and especially for poultry infected with chronic respiratory disease. A type of conventional feed material which may be employed is recommended to contain roughly between 50% and 80% of grains, between 0% and 10% animal protein, between 5% and 30% vegetable protein, between 2% and 4% minerals together with supplemental vitaminaceous sources. When a feed containing a major proportion of these substances and a minor proportion of one of the herein described compositions is employed, the poultry shows a marked improvement, if not complete recovery, over the infection and reach the desirable weight in a shorter period of time than usual with a markedly greater feed efficiency. It should be noted that these valuable products eliminate, or at least minimize, the economic losses normally associated with chronic respiratory disease.

It has further been found that the addition of a low level of the herein described antibiotic-quinoxaline-di-N-oxide compositions to the diet of animals, both ruminant and non-ruminant, such that these animals receive the product over an extended period of time, so as to provide each component at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, individual components of the herein described compositions and other factors known to be required for the maximum healthy growth of such animals. The animals thus attain market size sooner and on less feed.

The herein described feed compositions have been found to be particularly valuable and outstanding in promoting the growth of such animals as poultry, rats, hogs, swine, lambs, cattle, and the like. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency (the number of pounds of feed required to produce a pound gain in weight). The novel feed supplements of this invention permit the use of higher energy, higher protein diets to obtain improved feed/gain ratios and the use of feedstuffs that at present are not utilized efficiently. Simply stated, the compositions of this invention when fed to animals are more efficiently converted to animal body weight than prior art compositions. Any animal feed composition may be prepared to comprise the usual nutritional balance of energy, proteins, minerals, and vitamins together with one or more of the antibiotic-quinoxaline-di-N-oxide combinations described herein. Some of the various components are commonly grains such as ground grain, and grain by-products; animal protein substances, such as meat, and fish by-products; vitaminaceous mixtures, e.g. vitamin A and D mixtures, riboflavin supplements and other vitamin B complexes; and bone meal, limestone, and other inorganic compounds to provide minerals.

The relative proportions of the antibiotic and quinoxaline-di-N-oxide in feeds and feed concentrates may vary somewhat, depending upon the compound, the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

Dry pre-mixes containing these compounds are prepared containing from 0.10 to about 10% of the active ingredients mixed with salt (sodium chloride) and other minerals which it is desired to incorporate into the poultry ration. This can then be fed on an ad libitum basis by adjusting the proportion of active ingredient in the mixture to the average daily consumption per animal so as to provide the proper daily dose as specified above. If prepared feed supplements are employed, the material can be administered in admixture with the feed. Again a concentration range of about 0.10 to 10% of the drugs in the feed is employed. However, higher proportions can be satisfactorily employed depending upon the palatability of the product to the animal. This can be readily determined by simple experimentation. It is sometimes convenient to mix the daily dose with only a portion of the average daily allotment to insure complete consumption of the dose. The balance of the daily feed supplement can then be fed after consumption of the medicated portion in the usual fashion. These methods are particularly useful for prophylactic treatment, but similar compositions can be employed for therapeutic use.

In the preparation of concentrates a wide variety of carriers may be employed containing the aforesaid drugs. Suitable carriers include the following: soybean oil meal, corn gluten meal, cotton seed oil meal, sunflower seed meal, linseed oil meal, cornmeal, limestone and corncob meal. The carrier facilitates uniform distribution of the active materials in the finished weed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drugs in such concentrates are capable of wide variation since the amount of active materials in the finished feed may be adjusted by blending the appropriate proportion of concentrate with the feed to obtain the desired degree of supplementation. In the preparation of high potency concentrates, i.e. premixes, suitable for blending by feed manufactures to produce finished feeds or concentrates of lower potency, the content of each drug component may range from about 0.1 g. to 50 g. per pound of concentrate. A particularly useful concentrate is provided by blending 2 g. of drug composition with 1 pound of limestone or 1 pound of limestone soybean oil means (1:1). Other dietary supplements, such as vitamins, minerals, etc. may be added to the concentrates in the appropriate circumstances.

The concentrates described may also be added to animal feeds to produce a nutritionally balanced, finished feed containing from about 10 g. to about 500 g. of the quinoxaline-di-N-oxide and from about 10 g. to about 2000 g. of 5-hydroxytetracycline per ton of finished feed. In the case of ruminants the finished feed should contain protein, fat, fiber, carbohydrate, vitamins and minerals, each in an amount sufficient to meet the nutritional requirements of the animal for which the feed is intended. Most of these substances are present in naturally ocurring feed materials, such as alfalfa hay or meal, cracked corn, whole oats, soybean oil meal, corn silage, ground corn cobs, wheat bran, and dried molasses. Bone meal, limestone, iodized salt and trace minerals are frequently added to supply the necessary minerals, and urea to provide additional nitrogen.

As is well known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80% of grains, 3 to 10% animal protein, 5 to 30% vegetable protein, 2 to 4% of minerals, together with supplementary vitaminaceous sources.

The following examples illustrate in greater detail the manner of practicing the present invention. They are, however, not to be construed as limiting the scope thereof in any way. All values reported are average values. The "efficacy index" is defined as 100 times the ratio of the pounds of feed per pound of grain produced by the unsupplemented feed to that produced by the supplemented feed.

EXAMPLE I

The following solutions were prepared and immediately introduced into galvanized iron cans (6" height, 4" diameter):

Can 1—2-methyl-3-hydroxymethylquinoxaline-di-N-oxide (50 mg., 0.25 mmole) in one liter of water Can 2—2-methyl-3-hydroxymethylquinoxaline-di-N-oxide (50 mg., 0.25 mmole) and 5-hydroxytetracycline hydrochloride (150 mg., 0.30 mmole) in one liter of water Can 3—5-hydroxytetracycline hydrochloride (150 mg., 0.30 mmole) in one liter of water.

The amount of 2-methyl-3-hydroxymethylquinoxaline-di-N-oxide in Cans 1 and 2 was determined by ultraviolet spectroscopy at various time intervals. Water was used as a blank for the solution of Can 1 and solution from Can 3 was used as a blank for the solution of Can 2.

| | Percent quinoxaline-di-N-oxide | |
|---|---|---|
| | Can 1 | Can 2 |
| Hour: | | |
| 0 | 100 | 100 |
| 24 | 78 | 100 |
| 48 | 51 | 100 |
| 72 | 37 | 100 |
| 96 | 29 | 96 |

After 168 hours of exposure to the galvanized iron surface, the solution of Can 2 was analyzed by polarography and found to contain 100% of the original amount of 2-methyl-3-hydroxymethylquinoxaline-di-N-oxide.

EXAMPLE II

The procedure of Example I is repeated wherein the concentration of 5-hydroxytetracycline hydrochloride in each experiment is, respectively, 12.5 mg./l., 50 mg./l., 1000 mg./l. and 1250 mg./l. The rate of reduction of 2-methyl-3-hydroxymethylquinoxaline-di-N-oxide in Can 2 is substantially less than that in Can 1 at each concentration of 5-hydroxytetracycline hydrochloride.

EXAMPLE III

The procedure of Example I is repated wherein equivalent amounts of the following compounds are used, individually, in place of said 5-hydroxytetracycline hydrochloride, with the rate of reduction of 2-methyl-3-hydroxymethylquinoxaline-di-N-oxide in Can 2 being substantially less than that in Can 1 in each instance:

tetracycline hydrochloride
7-chlorotetracycline hydrochloride
methacycline hydrochloride
doxycycline hydrochloride
amphoteric tetracycline
amphoteric-5-hydroxytetracycline

EXAMPLE IV

The procedure of Example I is repeated wherein equivalent amounts of the following quinoxaline-di-N-oxides are used, individually, in place of said 2-methyl-3-hydroxymethylquinoxaline-di-N-oxide, with the rate of reduction of the quinoxaline-di-N-oxide in Can 2 being substantially less than that in Can 1 in each instance:

2,3-dimethylquinoxaline-di-N-oxide
2-methylquinoxaline-di-N-oxide
1,2,3,4-tetrahydrophenazine-di-N-oxide
1,4-dihydroxy-1,2,3,4-tetrahydrophenazine-di-N-oxide
2,3-trimethylenequinoxaline-di-N-oxide

EXAMPLE V

One liter of aqueous 5-hydroxytetracycline hydrochloride (150 mg./l.) is placed in a galvanized iron can (6" height, 4" diameter) for 5 days, after which time the solution is poured out and replaced with one liter of aqueous 2-methyl-3-hydroxymethylquinoxaline-di-N-oxide (50 mg./l.). After 48 hours of exposure to the galvanized iron surface, the latter solution is analyzed by ultraviolet spectroscopy and found to contain 98% of the original amount of 2-methyl-3-hydroxymethylquinoxaline-di-N-oxide, compared to 51% when the can was not pretreated with 5-hydroxytetracycline hydrochloride.

EXAMPLE VI

The procedure of Example V is repeated wherein the concentration of said 5-hydroxytetracycline hydrochloride in each experiment is, respectively, 12.5 mg./l., 50 mg./l., 1000 mg./l. and 1250 mg./l. At each concentration, the rate of reduction of 2-methyl-3-hydroxymethylquinoxaline-di-N-oxide is substantially less in a pretreated can than in a can which has not been pretreated with the 5-hydroxytetracycline hydrochloride solution.

EXAMPLE VII

The process of Example V is repeated wherein equivalent amounts of the following compounds are used, individually, in place of said 5-hydroxytetracycline hydrochloride:

tetracycline hydrochloride
7-chlorotetracycline hydrochloride
methacycline hydrochloride
doxycycline hydrochloride
amphoteric tetracycline
amphoteric 5-hydroxytetracycline In each instance, the rate of reduction of 2-methyl-3-hydroxymethylquinoxaline-di-N-oxide is substantially less in a pretreated can than in a can which has not been pretreated with the tetracycline-type antibiotic.

EXAMPLE VIII

The process of Example V is repeated wherein equivalent amounts of the following compounds are used, individually, in place of said 2-methyl-3-hydroxymethylquinoxaline-di-N-oxide:

2,3-dimethylquinoxaline-di-N-oxide
2-methylquinoxaline-di-N-oxide
1,2,3,4-tetrahydrophenazine-di-N-oxide
1,4-dihydroxy-1,2,3,4-tetrahydrophenazine-di-N-oxide
2,3-trimethylenequinoxaline-di-N-oxide In each instance, the rate of reduction of the quinoxaline-di-N-oxide is substantially less in a pretreated can than in a can which has not been pretreated with 5-hydroxytetracycline hydrochloride.

EXAMPLE IX

The effectiveness of 2,3-dimethylquinoxaline-di-N-oxide in combination with 5-hydroxytetracycline in controlling coliform infection in chickens is demonstrated as follows.

Four-week old chickens are infected with coliform air sacculitis by injecting 0.5 ml. of a 24-hour broth culture of two 5-hydroxytetracycline resistant, avian pathogenic isolates of $E.\ coli$ standardized to 47% light transmission into the left posterior thoracic air sec.

Seven groups of 10 birds each are used as indicated below. The treated birds are administered the drugs by subcutaneous inoculation into the upper cervical region at the time of exposure to $E.\ coli$. Each lot is replicated twice. After five experimental days, all surviving chickens are sacrificed and the extent of air sac lesion determined according to the following method of scoring: 0—no visible lesion; 1—lesion confined to one air sac; 2—lesion involving 2 air sacs with no inflammatory extension to adjacent tissues; 3—lesion involving 3 or 4 air sacs with no inflammatory extension to adjacent tissues; 4—lesion involving 4 or more air sacs with or without inflammatory extension to adjacent tissues. The results, presented in Table I, demonstrate a synergistic action against the coliform air sacculitis infection for the two drugs in combination and an enhanced effect on growth.

TABLE I

| Lot | Quinoxaline-di-N-oxide dose, mg./bird | 5-hydroxy tetracycline, mg./bird | Lesion score | Percent mortality | Feed consumption per lot post injection | Wt. gain, g./bird | Efficacy index |
|---|---|---|---|---|---|---|---|
| 1 | (1) | (1) | 0 | 0 | 2,916 | 178.7 | 100 |
| 2 | (2) | (2) | 3.15 | 5 | 1,492 | 57.3 | 0 |
| 3 | 5.0 |  | 1.5 | 0 |  | 160.8 | 61.0 |
| 4 | 5.0 | 25.0 | 1.45 | 0 | 2,817 | 171.4 | 64.2 |
| 5 | 10.0 |  | 1.40 | 0 | 2,826 | 160.5 | 61.20 |
| 6 | 10.0 | 25.0 | 0.90 | 0 | 2,728 | 180.1 | 88.70 |
| 7 |  | 25.0 | 3.05 | 0 | 1,763 | 51.6 | 8.50 |

[1] Non-infected, nonmedicated controls.
[2] Infected, non-medicated controls.

EXAMPLE X

The procedure of Example IX is repeated but using seven lots of four-week-old turkeys, 15 birds per lot. The treatment schedule and results are presented below (Table II). Here again, a synergistic effect against the coliform infection and a marked improvement in growth is demonstrated.

TABLE II

| Lot | Quinoxaline-di-N-oxide dose, mg./bird | 5-hydroxy tetracycline, mg./bird | Lesion score | Percent mortality | Feed consumption per lot post injection | Wt. gain, g./bird | Efficacy index |
|---|---|---|---|---|---|---|---|
| 1 | (1) | (1) | 0.26 | 0 | 5,614 | 316.5 | 100 |
| 2 | (2) | (2) | 3.50 | 14.2 | 2,694 | 154.9 | 0 |
| 3 | 5.0 |  | 2.35 | 0 | 4,640 | 254.5 | 46.4 |
| 4 | 5.0 | 25.0 | 1.64 | 0 | 4,913 | 288.3 | 81.5 |
| 5 | 10.0 |  | 2.28 | 0 | 4,750 | 248.8 | 51.0 |
| 6 | 10.0 | 25.0 | 1.92 | 14.2 | 4,744 | 296.9 | 70.6 |
| 7 |  | 25.0 | 3.71 | 0 | 3,683 | 186.8 | 11.7 |

[1] Non-infected, nonmedicated controls.
[2] Infected, non-medicated controls.

EXAMPLE XI

Four-week-old turkeys are infected with coliform air sacculitis by injecting 0.5 ml. of a 24-hour broth culture of two avian pathogenic 5-hydroxytetracycline resistant isolates of $E.\ coli$ (standardized to 47% light transmission) into the left posterior thoraci air sac. The drugs are administered in the feed, the medicated rations being fed for a five-day period starting one day prior to $E.\ coli$ exposure. The feed is tendered to the birds for imbibition ad libitum. The birds, 15 per lot, are checked as to mortality, average weight change, feed consumption and, after sacrifice 5 days post-injection, for air sac lesion score. The effectiveness of the combination of 2,3-dimethylquinoxaline - di - N - oxide and 5 hydroxytetracycline is evident from the data below (Table III). The synergistic action of the two drugs is thus demonstrated. Also evident is a significant improvement in weight gain.

lowing modifications. A challenge of 0.5 ml. of media containing ten million avian pathogenic,

TABLE III

| Lot | Quinoxaline-di-N-oxide dose, g./ton | 5-hydroxy-tetracycline, g./ton | Lesion score | Percent mortality | Feed consumption per lot post injection | Wt. gain, g./bird | Efficacy index |
|---|---|---|---|---|---|---|---|
| 1 | (1) | (1) | 0.92 | 0 | 4,909 | 206.6 | 100 |
| 2 | (2) | (2) | 2.92 | 7 | 3,274 | 132.0 | 0 |
| 3 | 125 |  | 2.84 | 0 | 4,145 | 204.7 | 29.2 |
| 4 | 125 | 500 | 2.14 | 0 | 4,149 | 198.8 | 49.1 |
| 5 | 250 |  | 2.07 | 0 | 3,992 | 193.6 | 48.4 |
| 6 | 250 | 500 | 1.07 | 7 | 4,552 | 229.6 | 108.8 |
| 7 |  | 500 | 3.50 | 7 | 2,725 | 91.8 | 0 |

1 Non-infected, non-medicated control.
2 Infected, non-medicated control.

EXAMPLE XII

The therapeutic value of 2 - methyl - 3-hydroxymethyl-quinoxaline-di-N-oxide for the control of coliform air sacculitis in chickens is demonstrated as follows. Five lots of four-week-old chickens, 10 birds per lot, are exposed to *E. coli* by injecting into the left posterior thoracic air sac 0.5 ml. of a 24-hour culture of two avian pathogenic 5-hydroxytetracycline resistance isolates of *E. coli*, standardized to 47% light transmission. Each infected bird is administered the drug by a single subcutaneous innoculation into the upper cervical region at the time of exposure to *E. coli*. A lot of ten birds is used as control. Each lot is replicated twice. Pertinent data, presented in Table IV, demonstrate the synergistic action of this drug when used in combination with 5-hydroxytetracycline.

EXAMPLE XIV

The efficacy of 1,4 - dihydroxy - 1,2,3,4 - tetrahydrophenazine - di - N - oxide in combination with 5-hydroxytetracycline in controlling PPLO infections in chicks is demonstrated as follows. Seven lots of two-week-old chickens (10 birds per lot) are exposed to PPLO infection by injecting into the left posterior thoracic air sac 0.25 ml. of a 72-hour broth culture of PPLO. Each infected bird is then administered the drug by subcutaneous inoculation into the upper cervical region at the time of exposure to PPLO. A single inoculation is administered per bird. An additional lot of ten birds serves as non-infected, non-medicated controls. Each lot is replicated twice. The treatment schedule and results are summarized in Table VI.

TABLE IV

| Lot | Quinoxaline-di-N-oxide | | 5-hydroxy tetracycline | | Lesion score | Percent mortality | Performance index+ | Efficacy index |
|---|---|---|---|---|---|---|---|---|
| | Mg./bird | Mg./kg. B.W. | Mg./bird | B.W. | | | | |
| 1 | (1) | (1) |  |  |  |  | 100 | 100 |
| 2 | (2) | (2) |  |  | 3.64 | 14 | 10.9 | 0 |
| 3 | 10.0 | 13.35 |  |  | 1.64 | 0 | 81.8 | 57.7 |
| 4 | 10.0 | 13.52 | 25.0 | 33.80 | 0.64 | 0 | 91.0 | 91.5 |
| 5 |  |  | 25.0 | 31.69 | 3.64 | 57 | 11.7 | 0 |

+ Performance Index=ratio of weight of the chickens to feed efficiency.
1 Non-infected, non-medicated control.
2 Infected, non-medicated control.

EXAMPLE XIII

The therapeutic efficacy of several quinoxaline-di-N-oxides in combination with 5-hydroxytetracycline is demonstrated by the following experiments.

A. Four-week-old chickens are exposed to an avian pathogenic, broad spectrum antibiotic resistant *E. coli* infection by injection into their left posterior thoracic air sac of 0.5 ml. of media containing approximately eight million organism per ml. The test chickens are administered the drug in their feed for a five-day period beginning 48 hours prior to challenge with *E. coli*. Each bird received 25 million viable *E. coli* organisms. The lesion score is determined 12 days post-inoculation upon sacrifice of the chickens. Twenty birds are used per treatment.

Pertinent data are presented below in Table V–A.

B. The above procedure is repeated but with the fol-

TABLE VI

| Lot | Quinoxaline-di-N-oxide dose, mg./bird | 5-hydroxy-tetracycline, mg./bird | Lesion score | Percent mortality | Efficacy index |
|---|---|---|---|---|---|
| 1 | (1) | (1) | 0 | 0 | 100 |
| 2 | (2) | (2) | 2.00 | 0 | 0 |
| 3 | 2.5 |  | 2.1 | 0 | 3.98 |
| 4 | 2.5 | 12.5 | 0.20 | 0 | 94.43 |
| 5 | 5.0 |  | 1.90 | 0 | 10.89 |
| 6 | 5.0 | 12.5 | 0.5 | 0 | 79.37 |
| 7 |  | 12.5 | 0.35 | 0 | 90.10 |

1 Non-infected, non-medicated controls.
2 Infected, non-medicated controls.

EXAMPLE XV

The efficacy of 1,4 - dihydroxy - 1,2,3,4 - tetrahydrophenazine - di - N - oxide, its isomeric form and a 2,3-dimethylquinoxaline-di-N-oxide in combination with 5-hydroxtetracycline in feed for the control of PPLO injection in chickens is demonstrated as follows and in Table VII. Four lots of four-week-old chickens (10 birds per lot) are exposed to PPLO infection by injecting into the left posterior thoracic air sac 0.5 ml. of a 72-hour broth culture of PPLO. One broad-spectrum antibiotic resistant *E. coli* organisms is used. Medication is begun 24 hours prior to challenge with *E. coli* and all birds are ulthanized and autopsied ten days post-inoculation. Ten birds are used per treatment, each of which is replicated six times. Pertinent data is presented in Table V-B.

tetracycline in treating a PPLO infection in four-week-old chickens is demonstrated as follows. Six lots of birds, 10 birds per lot (each replicated twice), are exposed to PPLO infection by injection, into their left posterior thoracic air sac, of 0.5 ml. of a 72-hour broth culture of PPLO. The drugs are administered in the feed starting one day prior to PPLO exposure and continued for a 5-day period. Unsupplemented feed is provided the birds throughout the remainder of the experiment. One lot of

TABLE V-A

| Quinoxaline-di-N-oxide | G./ton | 5-hydroxy-tetra-cycline, g./ton | Percent mortality | Average Lesion score | Performance index | Efficacy index |
|---|---|---|---|---|---|---|
| Non-infected, non-medicated control | | | 0 | 0 | 100 | 100 |
| Infected, non-medicated control | | | 1 | 1.65 | 87.7 | 0 |
| 2-formyl | 200 | 500 | 0 | 0.90 | 93.5 | 70.4 |
| 2-methyl-3-acetoxymethyl | 200 | 500 | 0 | 0.50 | 106.4 | 94.7 |
| 2,3-diacetoxymethyl | 250 | 500 | 0 | 0.10 | 106.1 | 103.1 |
| 2-formylsemithiocarbazone | 200 | 500 | 0 | 0.80 | 81.8 | 66.2 |
| 2,3-dihydroxymethyl | 200 | 500 | 0 | 0.10 | 103.9 | 101.0 |
| 2-methyl-3-formyl carbethoxyhydrazone | 200 | 500 | 1 | 0.85 | 96.3 | 69.0 |
| 2,3-dimethyl | 200 | 500 | 0 | 0.25 | 101.6 | 95.7 |

TABLE V-B

| Quinoxaline-di-N-oxide | G./ton | 5-hydroxy-tetra-cycline, g./ton | Percent mortality | Average Lesion score | Performance index | Efficacy index |
|---|---|---|---|---|---|---|
| Non-infected, nonmedicated control | | | 0 | 0 | 100 | 100 |
| Infected, non-medicated control | | | 3 | 1.25 | 75.9 | 0 |
| 2-methyl-3-hydroxymethyl | 200 | 500 | 0 | 0.55 | 85.6 | 64.1 |
| 2-methyl-3-acetoxymethyl | 200 | 500 | 0 | 0.68 | 77.8 | 48.8 |
| 2,3-diacetoxy methyl | 200 | 500 | 3 | 0.72 | 90.2 | 56.9 | of these four groups serves as infected, non-medicated control. The remaining three groups are administered the drug in their feed for a five-day period starting one day prior to PPLO exposure. Upon completion of the five-day period the birds are sacrificed and examined for their air sac lesion score. One lot of ten birds serves as non-infected, non-medicated controls.

10 birds, replicated twice, serves as non-infected control. All birds are euthanized and autopsied on the tenth day. All birds are cultured for PPLO at the time of sacrifice.

Results are presented in Table VIII. It will be noted that 2,3-dimethylquinoxaline-di-N-oxide at 125 g./ton and 250 g./ton in combination with 5-hydroxytetracycline at

TABLE VII

| Lot | Quinoxaline-di-N-oxide | Dose, g./ton | 5-hydroxy-tetra-cycline, g./ton | Lesion score | Percent mortality | Efficacy index |
|---|---|---|---|---|---|---|
| 1 | Non-infected, nontreated controls | | | 0 | 0 | 100 |
| 2 | Infected, non-treated controls | | | 2.65 | 0 | 0 |
| 3 | 1,4-dihydroxy THP+ | 250 | 500 | 1.35 | 0 | 48.10 |
| 4 | Isomer of 1,4-dihydroxy THP+ | 250 | 500 | 1.05 | 0 | 79.70 |
| 5 | 2,3-dimethyl | 250 | 500 | 0.35 | 0 | 93.86 |

+THP=1,2,3,4-tetrahydrophenazine.

EXAMPLE XVI

The exceptional therapeutic activity of 2,3-dimethyl-quinoxaline-di-N-oxide in combination with 5-hydroxy- 500 g./ton is especially effective, indeed synergistic, in controlling PPLO.

TABLE VIII

| Lot | Quinoxaline-di-N-oxide | | 5-hydroxy-tetra-cycline | | Percent mortality | PPLO positive | PPLO negative | Lesion score | Efficacy index | Performance |
| | Gm./ton | Mg./bird | Gm./ton | Mg./bird | | | | | | |
|---|---|---|---|---|---|---|---|---|---|---|
| 1 | (1) | (1) | | | 0 | 2 | 18 | 0 | 100 | 100 |
| 2 | (2) | (2) | | | 0 | 20 | 0 | 2.10 | 0 | 85 |
| 3 | 125 | 18.4 | | | 0 | 15 | 5 | 1.5 | 35.2 | 104 |
| 4 | 125 | 17.4 | 500 | 69.6 | 5 | 1 | 17 | 0.25 | 94.3 | 129 |
| 5 | 259 | 34.9 | | | 0 | 9 | 11 | 0.95 | 70.9 | 128 |
| 6 | 250 | 34.9 | 500 | 69.8 | 0 | 0 | 20 | 0.25 | 99.7 | 120 |
| 7 | | | 500 | 72.6 | 0 | 7 | 13 | 0.45 | 90.9 | 103 |

[1] Non-infected, non-medicated control.
[2] Infected, non-medicated control.

EXAMPLE XVII

This experiment demonstrates the therapeutic activity of 2-methyl-3-hydroxymethylquinoxaline-di-N-oxide in combination with 5-hydroxytetracycline against M. gallisepticum infection in chickens.

Three lots of 4½ week-old Cobb strain broilers, 10 birds per lot (three replicates) are exposed to M. gallisepticum by injecting into the left posterior thoracic air sac 0.5 ml. of a 72-hour agar broth culture of M. gallisepticum. The medicated rations are provided for five days starting 24 hours prior to challenge with M. gallisepticum. A fourth lot of 10 birds (three replicates) serves as control. The birds are sacrificed five days post challenge. Pertinent data are presented in Table IX.

TABLE IX

| Lot | Quinoxaline-di-N-oxide, g./ton | 5-hydroxy tetracycline, g./ton | Percent mortality | Lesion score | Performance | Efficacy index |
|---|---|---|---|---|---|---|
| 1 | (1) | | 0 | 0.0 | 100 | 100 |
| 2 | (2) | | 0 | 2.26 | 82 | 0 |
| 3 | 150 | | 0 | 1.33 | 100 | 81 |
| 4 | 150 | 400 | 0 | 0.70 | 107 | 86 |

1 Non-infected, non-medicated control.
2 Infected, non-medicated control.

EXAMPLE XVIII

One hundred four-week-old broiler chickens are used to conduct this experiment designed to investigate the efficacy of 2,3-dimethylquinoxaline-di-N-oxide and 5-hydroxytetracycline against a PPLO infection. On the first experimental day, all chicks are exposed to an isolate of M. gallisepticum PPLO by injecting 0.5 ml. of a 72-hour broth culture into the left posterior air sac. Two replicate pens of ten chickens each are assigned to the following treatments: (1) non-infected, non-medicated control; (2) infected, non-medicated control; (3) 25 mg./chick of 5-hydroxytetracycline; (4) 10 mg./chick of 2,3-dimethylquinoxaline-di-N-oxide; (5) 25 mg./chick of 5-hydroxytetracycline and 10 mg./chick of 2,3-dimethylquinoxaline-di-N-oxide. The foregoing drugs are administered by subcutaneous inoculation into the upper cervical region at the time of exposure to PPLO. After five experimental days all surviving chickens are sacrificed and the extent of air sac lesion determined.

The reduction in air sac lesion score observed for the administration of the drugs in combination is greater than the sum of the reductions in lesion score noted for the administration of these two drugs individually (Table X).

TABLE X

| Lot | Quinoxaline-di-N-oxide Mg./bird | Quinoxaline-di-N-oxide B.W. | 5-hydroxy tetracycline Mg./bird | 5-hydroxy tetracycline B.W. | Percent mortality | Lesion score | Efficacy index |
|---|---|---|---|---|---|---|---|
| 1 | (1) | (1) | | | 0 | 0 | 100 |
| 2 | (2) | (2) | | | 5 | 1.75 | 0 |
| 3 | 10 | 14.40 | | | 0 | 1.40 | 31.61 |
| 4 | 10 | 14.84 | 25 | 37.11 | 0 | 0.65 | 84.35 |
| 5 | | | 25 | 36.56 | 0 | 1.20 | 46.32 |

1 Non-infected, non-medicated control.
2 Infected, non-medicated control.

EXAMPLE XIX

The procedure of Example XIII A is repeated using the following quinoxaline-di-N-oxides in place of those of Example XIII A:

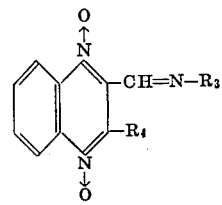

| R₃ | R₄ |
|---|---|
| —NH—CO—NH₂ | H |
| —NH—CO—NH₂ | CH₃ |
| —NH—COOCH₃ | H |
| —NH—COOCH₃ | CH₃ |
| —NH—COOC₃H₇ | H |
| —NH—COOC₄H₉ | H |
| ![pyrrolidinone] | H |
| ![pyrrolidinone] | CH₃ |
| —NH—CS—NH₂ | CH₃ |
| —OH | H |
| —OH | CH₃ |
| —NHCH₃ | H |
| —NHCH₃ | CH₃ |
| —NH—CO—CH₃ | H |
| —NH—CO—CH₃ | CH₃ |

EXAMPLE XX

A daily transfer study in Brain heart infusion was conducted with E. coli to compare the minimum inhibitory concentration (MIC) of 2-methyl-3-hydroxymethylquinoxaline-di-N-oxide, 5-hydroxytetracycline, and combinations thereof. The combinations tested had quinoxaline-di-N-oxide:5-hydroxytetracycline weight ratios of 1:1, 1:2 and 1:4. The inhibiting agent was added in increasing concentration to a series of E. coli containing tubes. The inoculum for each succeeding transfer was taken from the tube of the previous day's test with highest concentration of inhibiting agent which still showed growth. Thus, the inoculum came from the tube with concentration just below the MIC. The material was diluted 1×10⁻³ to serve as inoculum. In the following table, "QDO" refers to 2-methyl-3-hydroxymethylquinoxaline-di-N-oxide and "HTC" refers to 5-hydroxytetracycline.

TABLE XI

| Transfer | Inhibiting concentrations, mcg./ml., at each transfer as single entities | | Inhibiting concentration, mcg./ml., at each transfer of QDO plus HTC combinations | | |
|---|---|---|---|---|---|
| | QDO | HTC | 1:1/QDO/HTC | 1:2/QDO/HTC | 1:4/QDO/HTC |
| Original MIC | 62.5 | 1.9 | 1.9/1.9 | 0.9/1.9 | 0.4/1.9 |
| 1 | 250 | 3.9 | 1.9/1.9 | 0.9/1.9 | 0.4/1.9 |
| 2 | 500 | 3.9 | 3.9/3.9 | 1.9/3.9 | 0.9/3.9 |
| 3 | 500 | 7.8 | 3.9/3.9 | 1.9/3.9 | 0.9/3.9 |
| 4 | 500 | 15.6 | 1.9/1.9 | 1.9/3.9 | 1.9/7.8 |
| 5 | >500 | 31.2 | 7.8/7.8 | 7.8/15.6 | 3.9/15.6 |
| 6 | 500 | 31.2 | 7.8/7.8 | 3.9/7.8 | 1.9/7.8 |
| 7 | 500 | 31.2 | 3.9/3.9 | 7.8/15.6 | 3.9/15.6 |
| 8 | 500 | 31.2 | 7.8/7.8 | 1.9/3.9 | 3.9/15.6 |
| 9 | 500 | 31.2 | 7.8/7.8 | 7.8/15.6 | 3.9/15.6 |
| 10 | >500 | 31.2 | 7.8/7.8 | 7.8/15.6 | 3.9/15.6 |
| 11 | 500 | 31.2 | 3.9/3.9 | 7.8/15.6 | 7.8/31.2 |
| 12 | 500 | 31.2 | 3.9/3.9 | 15.6/31.2 | 3.9/15.6 |
| 13 | >500 | 31.2 | 7.8/7.8 | 15.6/31.2 | 3.9/15.6 |
| 14 | 500 | 31.2 | 7.8/7.8 | 15.6/31.2 | 3.9/15.6 |

The above data indicate that the 1:1 combination is the most effective of three combinations studied and is more effective than either compound used alone with respect to retardation of drug resistance development.

What is claimed is:

1. A method of inhibiting chemical reduction of a water-soluble quinoxaline-di-N-oxide in aqueous solution by zinc metal which comprises dissolving with said quinoxaline-di-N-oxide in said solution a water-soluble salt of a tetracycline antibiotic in an amount sufficient to inhibit said reduction.

2. The method of claim 1 wherein said water-soluble salt of a tetracycline antibiotic is pharmaceutically acceptable and the molar equivalent ratio of quinoxaline-di-N-oxide:tetracycline salt is between 1:0.1 and 1:10.0.

3. The method of claim 1 wherein said tetracycline antibiotic is a water-soluble salt of a compound selected from the group consisting of tetracycline, 5-hydroxytetracycline, 7 - chlorotetracycline, 6 - deoxy - 6 - demethyl-6-methylene - 5 - hydroxytetracycline and α-6-deoxy-5-hydroxytetracycline and said water-soluble quinoxaline-di-N-oxide is selected from the group consisting of 2-methyl-3 - hydroxymethylquinoxaline - di - N-oxide, 2,3-dimethylquinoxaline-di-N-oxide, 2 - methylquinoxaline-di-N-oxide, 1,2,3,4 - tetrahydrophenazine-di-N-oxide, 1,4-dihydroxy-1,2,3,4-tetrahydrophenazine-di-N-oxide and 2,3-trimethylenequinoxaline-di-N-oxide.

4. The method of claim 1 wherein said water-soluble quinoxaline-di-N-oxide is selected from the group consisting of 2-methyl-3-hydroxymethylquinoxaline-di-N-oxide, 2,3-dimethylquinoxaline-di-N-oxide, 2-methylquinoxaline-di-N-oxide, 1,2,3,4-tetrahydrophenazine-di-N-oxide, 1,4-dihydroxy - 1,2,3,4 - tetrahydrophenazine-di-N-oxide and 2,3-trimethylenequinoxaline-di-N-oxide.

5. The method of claim 1 wherein said tetracycline antibiotic is a water-soluble salt of a compound selected from the group consisting of tetracycline, 5-hydroxytetracycline, 7-chlorotetracycline, 6-deoxy-6-demethyl-6-methylene - 5 - hydroxytetracycline and α-6-deoxy-5-hydroxytetracycline.

6. The method of claim 1 wherein said tetracycline antibiotic is 5-hydroxytetracycline hydrochloride.

7. A method of inhibiting chemical reduction of 2-methyl-3-hydroxymethylquinoxaline-di-N-oxide in aqueous solution by zinc metal which comprises dissolving with said quinoxaline-di-N-oxide in said solution about 1.2 molar equivalent amount of a pharmaceutically acceptable water-soluble salt of a compound selected from the group consisting of tetracycline, 5-hydroxytetracycline, 7-chlorotetracycline, 6 - deoxy - 6 - demethyl-6-methylene-5-hydroxytetracycline and α - 6 - deoxy - 5-hydroxytetracycline.

8. The method of claim 7 wherein said salt is 5-hydroxytetracycline hydrochloride.

References Cited

UNITED STATES PATENTS

| 2,891,062 | 6/1959 | Ursprung | 260—267 |
| 2,974,167 | 3/1961 | Stephens | 260—559 |
| 3,344,022 | 9/1967 | Johnston | 167—53.1 |
| 3,359,160 | 12/1967 | Gordon | 167—53 |
| 3,371,090 | 2/1968 | Johnston | 260—240 |
| 3,022,218 | 1/1962 | Sherman | 167—53 |

ALBERT T. MEYERS, Primary Examiner

J. V. COSTIGAN, Assistant Examiner

U.S. Cl. X.R.

424—250

UNITED STATES PATENT OFFICE
CERTIFICATE OF CORRECTION

Patent No. 3,497,594 February 24, 1970

James D. Johnston

It is certified that error appears in the above identified patent and that said Letters Patent are hereby corrected as shown below:

Column 1, line 43, "311" should read -- 371 --; and "397,504" should read -- 397,004 --. Column 15, line 4, the subject matter beginning with "broad" and extending through line 33 of column 15, including both Tables V-A and V-B should be read as though it followed "pathogenic" at column 14, line 2.

Signed and sealed this 15th day of September 1970.

(SEAL)
Attest:

Edward M. Fletcher, Jr.
Attesting Officer

WILLIAM E. SCHUYLER, JR.
Commissioner of Patents